Oct. 29, 1968    E. E. MURRAY    3,407,580
FRUIT PICKING APPARATUS
Filed March 23, 1966    2 Sheets-Sheet 1
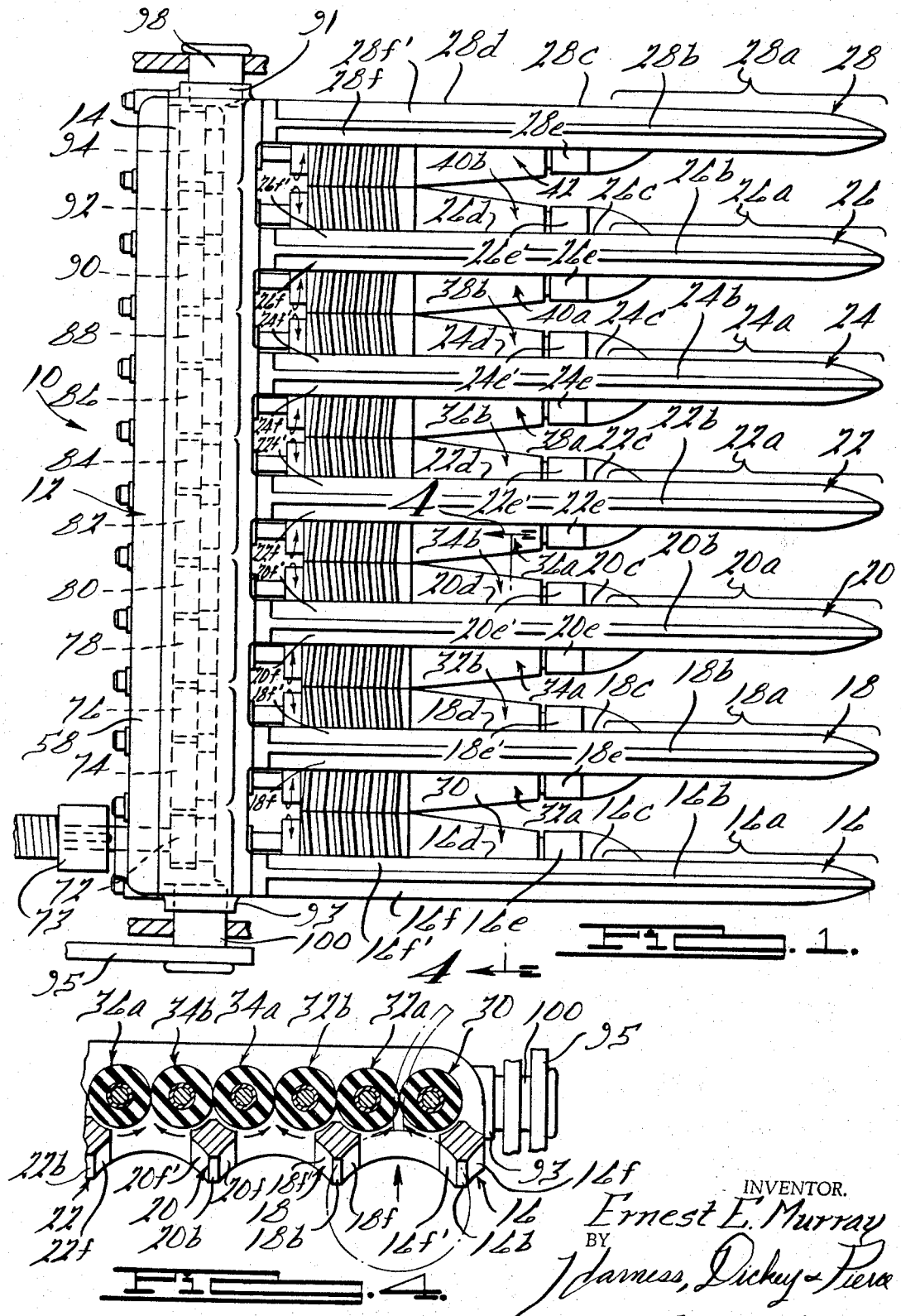
INVENTOR.
Ernest E. Murray
BY
Harness, Dickey & Pierce
ATTORNEYS

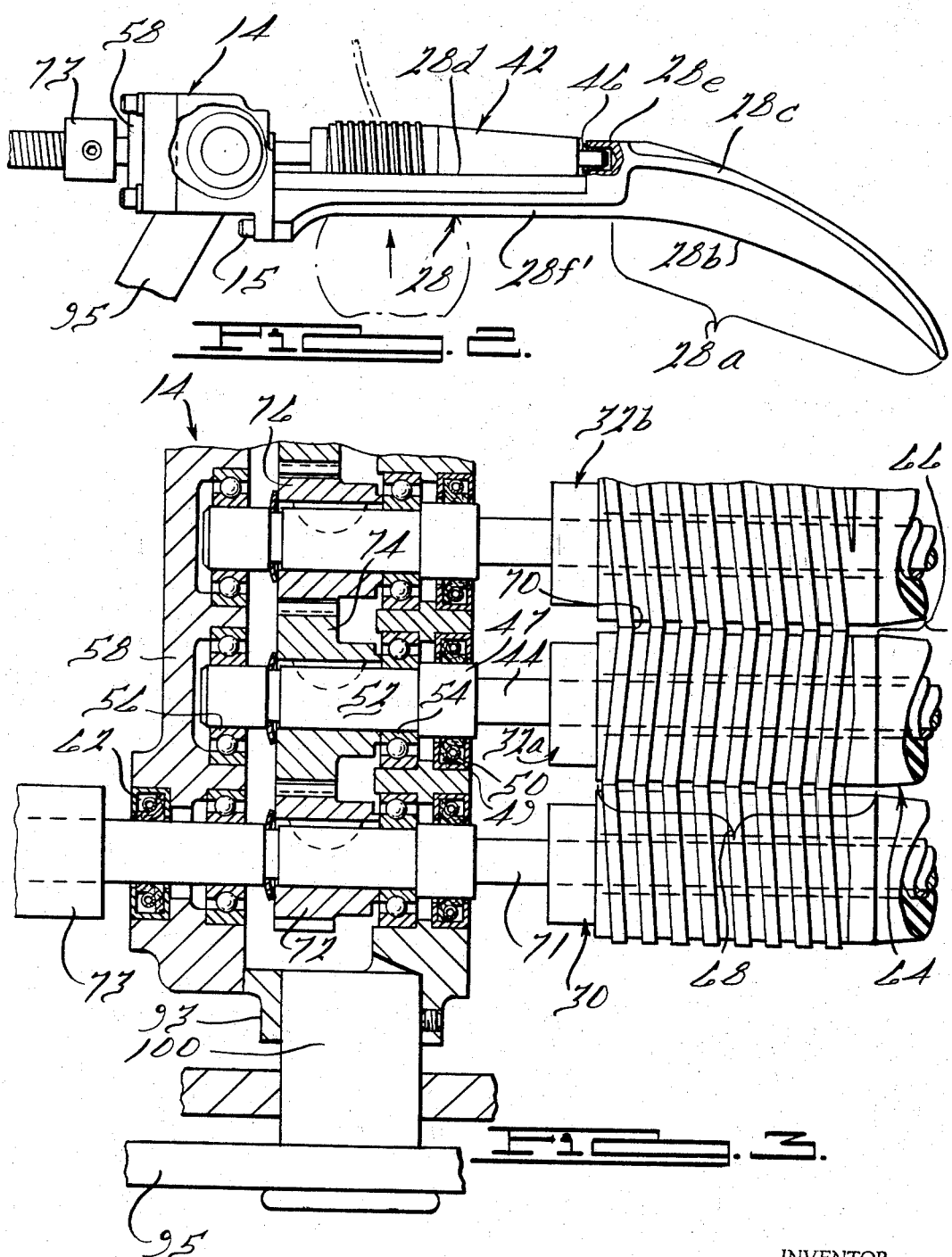

United States Patent Office 3,407,580
Patented Oct. 29, 1968

3,407,580
FRUIT PICKING APPARATUS
Ernest E. Murray, 6765 Meadowlake,
Birmingham, Mich. 48010
Filed Mar. 23, 1966, Ser. No. 536,901
17 Claims. (Cl. 56—328)

The present application relates to fruit pickers and more particularly a fruit picker construction for removing fruit such as oranges and the like from a tree.

In removing fruit such as oranges from a tree, it is important that it be done in a manner such that no damage results to the fruit. If the skin of the fruit is even slightly broken, the fruit will immediately begin to deteriorate and will be of less value. Therefore, it is an object of the present invention to provide for improved apparatus for picking fruit such as oranges and the like from a tree without damaging the fruit.

In manually picking fruit, such as oranges, the picker grasps the fruit and with a combination of cocking or pivoting (not twisting) and pulling action, removes the fruit from the branch. In this way the fruit is removed quickly and without damage to the skin. Therefore, it is another object of the present invention to provide for an automatic fruit picker which duplicates the manual action of a fruit picker in removing fruit from the tree by applying a combination of pulling and cocking action to the fruit.

In the present invention the picking of the fruit is done by gripping the branch upon which the fruit is located and then acting upon the fruit; therefore, it is an object of the present invention to remove fruit from a tree by an action including the gripping of the branch upon which the fruit is located.

Other objects, features, and advantages of the present invention will become apparent from the subsequent description and the appended claims, taken in conjunction with the accompanying drawings, in which:

FIGURE 1 is a bottom elevational view of a fruit picker embodying the features of the present invention;

FIGURE 2 is a right side elevational view of the fruit picker of FIGURE 1 with the bottom facing the lower edge of the drawing;

FIGURE 3 is an enlarged, fragmentary view of a portion of the picker shown in FIGURE 1 with some parts removed and other parts shown in section; and FIGURE 4 is a sectional view of the apparatus of FIGURE 1 taken substantially along the line 4—4 in FIGURE 1.

Looking now to FIGURE 1, the fruit picker is generally indicated by the numeral 10 and includes a gear box assembly 12 which includes a housing 14. Secured to the front wall of the housing 14, by bolts such as bolt 15, are a plurality of forwardly extending finger members 16 through 28. The finger members 16 through 28 are laterally spaced from each other and define a comb-like structure which, as will better be seen, facilitates combing the branches of a tree to be picked. The finger members 16 through 28, in moving through the branches, will engage the fruit and are made of wood, plastic or of some other construction whereby the fruit will not be cut. The finger members 16 through 28 extend longitudinally from the housing 14 and terminate in forward tip portions 16a through 28a, respectively, which are curved downwardly. The fingers 16–28 (see FIGURE 2) are of a ribbed construction and are, at their lower surfaces, provided with central, longitudinally extending narrow ribs 16b–28b, respectively, which, at their forward ends, taper arcuately to generally wider sections 16c–28c, respectively.

The rearward ends of the fingers 16–28 have cutaway or stepped sections 16d–28d at their lower surfaces. The fingers 18–26 are provided with pairs of enlarged bosses 18e, 18e'–26e, 26e' on opposite sides and at the forward ends of the stepped sections 18d–26d; the fingers 16 and 28 are each provided with a single boss 16e and 28e, respectively, on their inner side surfaces. At the stepped sections 16d–28d the central ribs 16b–28b taper to wider sections 16c'–28c' via arcuate surfaces 16f, 16f', respectively (see FIGURES 1 and 4).

Located in the stepped sections 18d–26d of the fingers 18–26 are pairs of roller assemblies 32a, 32b–40a, 40b respectively; located within the inner side of recesses 16d and 28d are individual roller assemblies 30 and 42, respectively.

Each of the roller assemblies 30, 32a, 32b–40a, 32b and 42 are of a similar construction and are mounted in a similar manner and hence, generally, the specific construction of one of the roller assemblies will be described.

Looking now to FIGURE 3, the roller assembly 32a includes a support shaft 44, the forward end of which is rotatably supported within an annular bushing member, such as member 46 in assembly 42 (see FIGURE 2), which is in turn supported in a bore in the boss 28e. The rearward end of the shaft 44 has an enlarged diameter portion 47 located in a counterbore 49 in the front face of the housing 14; an annular seal member 50 is located in counterbore 49 to provide a seal with the portion 47. Immediately rearwardly of the enlarged portion 47 is a reduced diameter portion 52 which is rotatably supported in a pair of spaced bearings 54 and 56. The bearing 54 is supported in the forward face of the housing assembly 14 while the bearing 56 is supported in a rear cover section 58 thereof. Supported on the forward portion of the shaft 44 is a roller member 64. The roller member 64 has a forward, radially inwardly tapering portion 66 and a generally enlarged portion 68 which is provided with a helically extending groove 70 which serves a purpose to be described. The roller assemblies 34a, 36a, 38a, 40a, and 42 are identical to roller assembly 32a. The roller assemblies 30, 32b, 34b, 36b, and 40b are similar to roller assembly 32a except that the grooves, such as groove 70, are wound oppositely. In addition, in the assembly 30 the shaft 71, similar to shaft 44, has its rearwardmost portion extending outwardly beyond the rear cover member 58 and passing through a seal member 62 supported in the member 58. The roller assemblies are adapted to operate in pairs with the roller assembly 30, adapted to operate with the roller assembly 32a, the assembly 32b with assembly 34a, etc. The roller assemblies are supported such that the helically grooved portions, such as portion 68 of roller 64, of cooperating pairs of roller assemblies, such as 30 and 32a, are in close proximity with each other.

The cooperating roller assemblies, such as assemblies 30 and 32a, are rotated (in a manner to be presently described) in opposite directions and hence any object located therebetween will tend to be fed therethrough. Rotation of the roller assemblies 30 and 32a is in the direction of the arrows such that objects will be moved upwardly, i.e., from the bottom to the top of the picker assembly 10. The helical grooves, such as groove 70, are constructed in a manner such that as the roller assemblies 30 and 32a are rotated, the object therebetween will be gripped and moved rearwardly, i.e. toward the housing 14, as well as upwardly (see FIGURE 4). The rollers, such as roller 64, are made of a resilient material such as rubber and hence are flexible. The roller assemblies 30, 32a, 32b–40a, 40b, and 42 are rotated by gears 72–94, respectively, located within the housing 14. The gear members of adjacent ones of roller assemblies 30, etc., are in mesh with each other and hence rotation of gear 72 will cause rotation of each of the others.

The shaft 71 extending outwardly beyond the rear cover 58 of the housing 14 is adapted to be gripped by a drive member 73 (partially shown) which can be secured to a flexible drive cable and rotated thereby. Upon rotation of the shaft 71, the gear member 72 will be rotated thereby causing rotation of the other gears and hence all of the roller assemblies 30, 32a, 32b–40a, 40b, and 42 will be rotated in a proper direction. The gear members 72–94 are alternately provided to be of different sizes with the gears 72, 76, 80, 84, 88, and 92 being larger than gears 74, 78, 82, 86, 90, and 94. Thus, alternate ones of pairs of cooperating roller assemblies, such as 30 and 32a, will be rotated slower than the other ones of the cooperating roller assemblies; this serves a purpose to be presently described.

In operation, the shaft 71 is rotated thereby effectuating the rotation of all of the roller assemblies, such as roller assembly 30. The picker assembly 10 is then combed through the branches of a tree holding fruit such as oranges. The finger members 16–28 guide the branches in between cooperating pairs of roller assemblies, such as 30 and 32a. Upon engaging the roller, such as roller 64, the branches are gripped and fed upwardly and rearwardly by the rotational action of the rollers; this is shown in phantom in FIGURES 2 and 4. Any fruit on the branch will be moved into engagement with the confronting lower curved portions of that pair of fingers 16 through 28 through which the branch is being moved; e.g., the orange shown in FIGURE 4 will engage curved surfaces 16f' and 18f. As this occurs the pair of rollers, such as roller 64, will continue to feed the branch upwardly and apply a relative force between the fruit and the branch which is sufficient to remove the fruit from the branch. With one of the rollers of the cooperating pair of roller assemblies, such as 30 and 32a, rotating faster than the other of the rollers, there will be a pivoting or cocking action applied between the branch and the fruit; this latter action simulates the hand action of the manual picker and results in the removal of the fruit without damage. The fruit as it is freed from the branch, can be caught in a suitable receptacle. The curved surfaces, such as 16f' and 18f, engage the fruit and keep the fruit from engaging the rollers thereby preventing scuffing of the fruit by the rollers and also rotation of fruit, i.e., about the axis of its branch or stem, by the rollers.

The rollers, such as roller 64, as located on their shafts, such as 44, are spaced from the housing 14 thereby providing for a clearance space between pairs of roller assemblies, such as 30 and 32a; this clearance space will prevent jamming of branches between the roller assemblies and the front of the housing 14.

In order to facilitate the operation of the fruit picker 10, bosses 91 and 93 are provided at opposite ends of the housing 14; shafts 98 and 100 are fixed on bosses 91 and 93, respectively, and are journaled in bushings whereby the picker 10 can be pivoted. At the same time a handle such as handle 95 can be secured to shaft 100 at one end of the picker 10 to permit pivoting the picker 10, either manually or mechanically to facilitate the combing action.

The durometer of the material of the rollers such as 64, is selected to be soft enough to grip the branches of the tree without damaging them and still firmly enough whereby the branches can be fed upwardly between the cooperating pairs of rollers.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A fruit picker for picking fruit such as oranges or the like from a tree comprising: finger means defining a comb-like structure for combing through the branches of a tree, said finger means including gripping means for gripping the branch upon which the fruit is held and for engaging the fruit and for removing the fruit by a relative force between the branch and the fruit.

2. The fruit picker of claim 1 in which said relative force applied by said gripping means includes a component pivoting the fruit relative to the branch.

3. The fruit picker of claim 1 in which said relative force includes a first generally tensile component and a second component pivoting the fruit relative to the branch.

4. The fruit picker of claim 1 with said gripping means including means for feeding the branch through said finger means.

5. The fruit picker of claim 1 with said gripping means including at least one pair of roller assemblies, said pair of roller assemblies including a pair of rollers supported proximately to each other and generally side by side and adapted to grippingly receive branches therebetween, and drive means connected to said rollers for rotating said rollers in directions to feed the branches therethrough.

6. The fruit picker of claim 5 with said rollers being spaced apart at their forward ends to define an inlet to receive branches and being proximate to each other at their rearward ends to grip the branches received.

7. The fruit picker of claim 6 with said rollers having a tapered construction at said forward ends.

8. The fruit picker of claim 5 with said rollers including means for feeding the branches generally in a direction along the axes of said rollers and in a direction transversely with said axes between said rollers.

9. The fruit picker of claim 6 with said rollers having helical grooves at said rearward ends and with said helical groove of one of said rollers being wound oppositely to the other.

10. The fruit picker of claim 5 with said finger means including a plurality of laterally spaced fingers for guiding the branches into said rollers.

11. The fruit picker of claim 10 with said rollers supported upon adjacent ones of said fingers.

12. The fruit picker of claim 5 with said drive means rotating one of said rollers faster than the other.

13. The fruit picker of claim 11 with said adjacent ones of said fingers having confronting surfaces extending beneath said rollers and in a location to engage the fruit as its branch is moved through said rollers.

14. The fruit picker of claim 13 with said confronting surfaces generally holding the fruit from engaging said rollers.

15. The fruit picker of claim 6 further including a housing for supporting said finger means with said rollers having a clearance space with said housing and between said rollers whereby branches will not be jammed at said rearward ends of said rollers.

16. The fruit picker of claim 1 further including a housing for supporting said finger means and with said finger means comprising at least one pair of laterally spaced elongated fingers supported on said housing and extending forwardly therefrom, at least one pair of roller assemblies each having its rearward end supported in said housing, said pair of roller assemblies having a pair of rollers located proximate to each other, drive means connected with said roller assemblies and supported in said housing for rotating said rollers with one of said rollers being rotated faster than the other, said fingers having confronting surfaces extending beneath said rollers and in a location to engage the fruit as its branch is moved through said rollers with said confronting surfaces generally holding the fruit from the rollers, said rollers having tapered portions at their forward ends to define an inlet to receive branches, said rollers being proximate to each other at their rearward ends, said rollers having helical grooves at said rearward ends with said helical groove of one of said rollers being wound oppositely to the other.

17. The fruit picker of claim 16 with said drive means comprising enmeshed gear members in each of said roller assemblies and with each said finger having a narrow central longitudinally extending rib at its bottom surface and having a recess at said rearward end for receiving said roller assembly, said central rib being contoured to an enlarged section via arcuately extending surfaces.

References Cited

UNITED STATES PATENTS

| | | | |
|---|---|---|---|
| 3,040,507 | 6/1962 | Lasswell | 56—328 |
| 3,077,720 | 2/1963 | Grove et al. | 56—328 |
| 3,127,725 | 4/1964 | Richardson | 56—328 |
| 3,164,942 | 1/1965 | Middlesworth et al. | 56—328 |
| 3,197,952 | 8/1965 | Lasswell | 56—328 |

RUSSELL R. KINSEY, *Primary Examiner.*